Sept. 28, 1965  A. A. HEDIGER ETAL  3,208,854
COFFEE BAG
Filed July 9, 1963
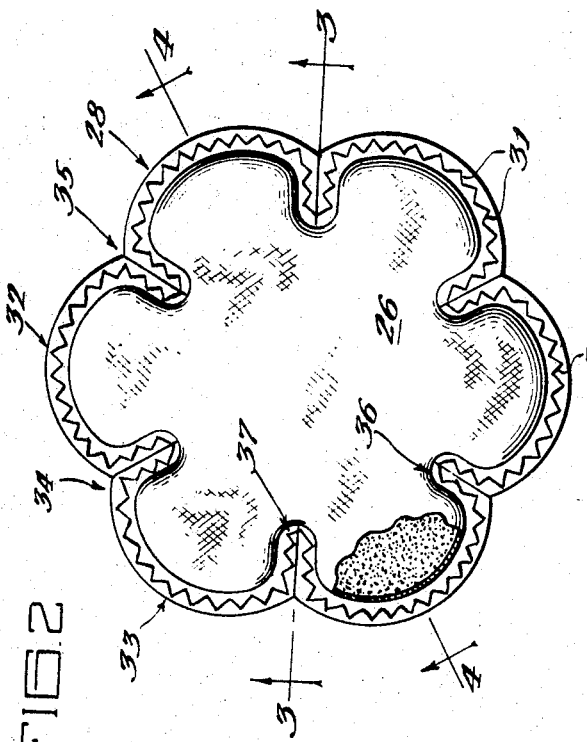
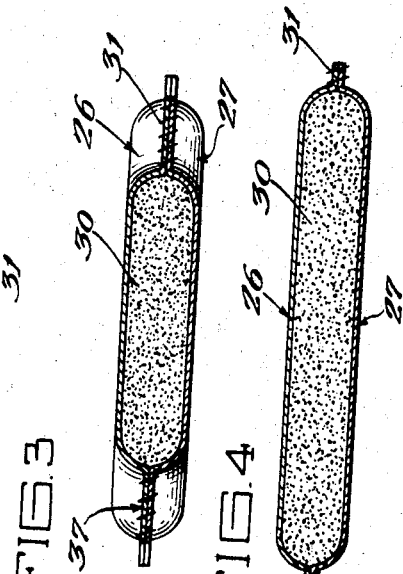
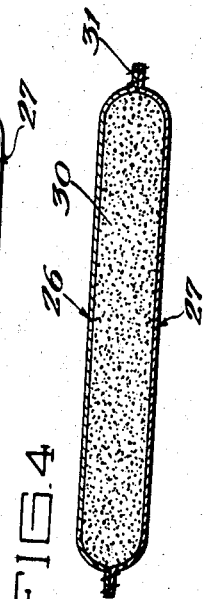
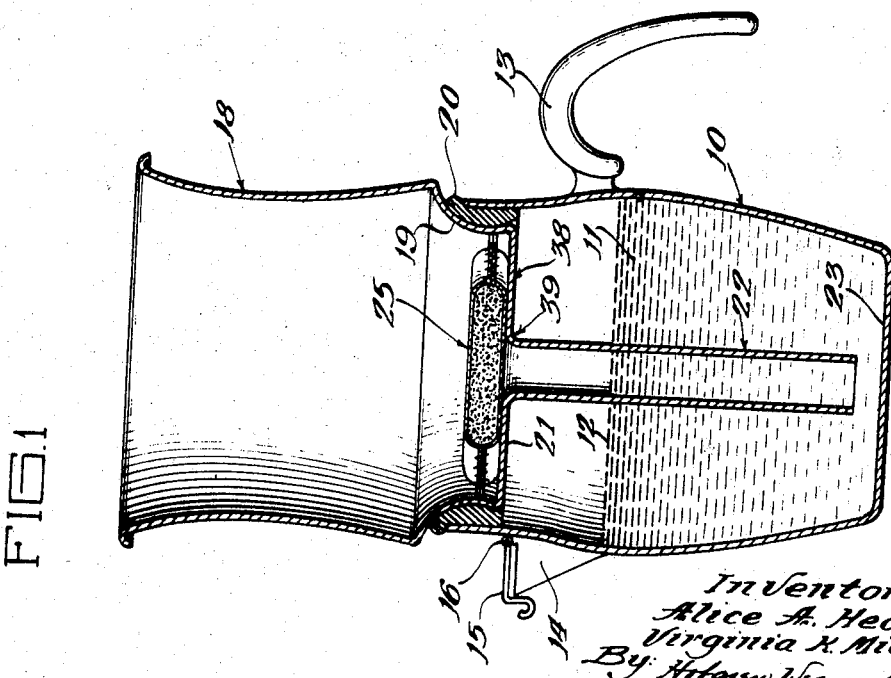
Inventors:
Alice A. Hediger
Virginia X. Michel
By: Hofgren, Wegner, Allen,
Stellman & McCord
Attorneys

United States Patent Office 3,208,854
Patented Sept. 28, 1965

3,208,854
COFFEE BAG
Alice A. Hediger, 1026 Greenwood, and Virginia K. Michel, 905 Linden Ave., both of Wilmette, Ill.
Filed July 9, 1963, Ser. No. 293,728
4 Claims. (Cl. 99—77.1)

This invention relates to a container for ground coffee and more particularly to a unique coffee bag useful in the brewing of coffee lacking an offensive bitterness in taste.

Bags for containing coffee have been made in various forms over the years and various types of grinds of coffee beans have been used in different kinds of coffee makers in order to brew a palatable coffee liquid. Some tastes prefer a brewed liquid relatively mild in nature and practically devoid of the relatively bitter taste of the coffee bean itself. Such a liquid can be obtained by a restricted or limited contact of heated water with the ground coffee bean. It is in the making of the latter palatable coffee brew that the present invention is particularly useful.

It is therefore the principal object of this invention to provide a new and useful coffee bag for the brewing of a coffee flavored liquid.

It is another object of this invention to provide a disposable bag useful with a currently available coffee maker permitting the making of a coffee liquid devoid of a bitter taste.

A further object is to provide a coffee bag of the character described in which liquid may pass downwardly in the coffee maker past the bag without seeping through either the bag or coffee grounds therein, thus avoiding additional picking up of the coffee essence when the brewing of the liquid is desired to be stopped.

Other objects, features and advantages of this invention will be apparent from the following description of a preferred embodiment of the invention illustrated in the acompanying drawings, in which:

FIGURE 1 is a side elevational view mostly in section through a coffee maker with the coffee bag of this invention in operative position therein;

FIGURE 2 is an enlarged top plan view partially in broken section of the coffee bag of this invention;

FIGURE 3 is a sectional view through the coffee bag of this invention taken substantially along line 3—3 in FIGURE 2; and FIGURE 4 is a sectional view through the coffee bag taken substantially along line 4—4 in FIGURE 2.

The coffee maker with which the present bag has been used is of the type that uses a so-called regular grind of coffee. The maker has a lower metal or glass water container 10 in which water 11 is illustrated extending upwardly to the level 12. The container is expected to be placed upon a domestic stove in order to receive heat sufficient to boil the water 11. A heat insulated handle 13 is permanently attached to the lower section 10 of the coffee maker and a spout 14 opposite the handle is provided for pouring the liquid contents of the container. In some instances, it is desirable to provide a removable hinged cover 15 secured by hinge 16 to the coffee maker for closing the spout against some escape of steam from the lower section.

The upper portion 18 of the coffee maker is an upwardly open, generally cup-shaped container of a capacity to receive most, if not all, of the water 11 from the bottom container 10. An inwardly curved section 19 near the bottom of the upper container supports a resilient gasket 20 which seals the two container parts together when in the assembled position of FIGURE 1. The bottom wall 21 of the upper container joins with a downwardly extending water column 22 centrally of the upper container and extending downwardly in the assembly near the bottom 23 of the lower container. A coffee bag 25 of the present invention is shown resting upon the bottom 21 of the upper container spanning the open upper end of the water column 22. In operation as the water 11 is heated and boiled, it will rise into the upper container. When the coffee maker is taken off of the source of heat, the water will return to the lower container as the pressure therein is diminished. This process may be aided and speeded by flipping the cover 15 from the spout 14 opening the same.

The coffee bags of this invention are intended to be disposable and made in sizes to fit the coffee makers generally available and further made in multiples measured in accordance with the traditional two, four or six cup measures. We prefer to make the coffee bags each of a two cup size permitting a housewife to use multiples thereof for greater capacity when desired.

Referring primarily to FIGURES 2 to 4, the coffee bag is made of a top wall 26 and a bottom wall 27, each having a peripheral edge generally indicated 28 in FIGURE 2, which is co-terminous, of the same shape and superposed in mating relationship with the edge of the other wall. The bottom and top walls are formed of a filter paper or cloth of fibrous material which will readily allow the passage of water therethrough but will not allow the ground coffee or grains thereof to readily pass the material. The top and bottom walls are spaced apart to receive ground coffee 30 between the walls and intermediate the joined peripheral edges. We prefer to use a sewing stitch of thread 31 to join the edges of the top and bottom walls although other forms of fastening, such as adhesives incapable of being dissolved at boiling water temperatures, may be used.

The shape of both the top and bottom walls is generally circular so that the outer extremities, such as 32 and 33 (FIGURE 2), all lay on an inscribed circle substantially the size of the diameter of the walls 19 in the lower portion of the coffee maker. The shape of the outer edges is scalloped so that areas or spaces, such as 34 and 35, are provided at the periphery of the bag in between the outer extremities such as 32 and 33. When the bag is in the coffee maker, the spaces such as 34 and 35 being free of either bag or coffee provides a free flow space or passageway for the water to pass around the bag without passing through either bag or coffee. By this shape of the bag, the steeped liquid in the upper section of the coffee maker may quickly pass the coffee bag and return to the lower member 10 without further brewing when desired.

In order to aid the quick passage of the liquid from the upper to the lower container without further extraction of the essence from the coffee, the sewing 31 on the edge of the bag is extended toward the central part of the bag at the inner extent of each scallop, such as is illustrated at 36 and 37 in FIGURE 2. Six such areas between the adjacent scallops are shown in the plan view of FIGURE 2. Referring to FIGURES 1 and 3, the sewing in toward the central part of the bag indents the bag in this area providing a very short distance from the point or place 38 at the bottom of the bag shown in FIGURE 1 to the upper edge 39 of the upstanding water column 22. This short space is all that has to be traversed by the liquid in the upper container to get past the bag and into the water column so as to return to the lower coffee maker part.

By joining the edges by the sewing 31 each bag is provided with a peripheral ledge which spaces the coffee inside the bag inwardly from the surrounding walls 19 of the coffee maker. Any water passing the edges of the bag will not come in contact with the coffee and in accordance with the invention, may be quickly returned to the lower coffee maker without further extraction of the coffee essence. With such construction it has been found that a coffee liquid completely devoid of any bitter taste and very palatable may be made.

The foregoing detailed description has been given for clearness of understanding only and no unnecessary limitations should be understood therefrom for some modifications are obvious to those skilled in the art.

We claim:

1. A coffee bag for use in brewing coffee, comprising: a quantity of coffee, a closed bag enclosing said coffee and having top and bottom walls of water permeable material edge joined and spaced apart intermediate the edges to form a relatively flat bag, each wall of said bag having co-terminous edges with mating scallops extending around the bag, the outer extremities of said walls laying generally on a circle so that the bag may be placed in a generally round coffee maker container of similar size as said circle without substantial distortion of the free form of the bag, said joined edges extending around and following said scallops providing circumferentially spaced areas about the periphery of the bag and said top and bottom walls being joined together radially at the juncture of the scallops for passage of fluid downwardly past and under the coffee bag without passage through the bag and ground coffee therein aiding quick flow of brewed liquid away from the coffee bag.

2. A coffee bag for use in brewing coffee, in a coffee maker having a substantially round container for ground coffee, comprising: a quantity of coffee, a closed bag containing said quantity and having top and bottom walls of water permeable material capable of retaining ground coffee from passage through the walls, said top and bottom walls being generally round with superposed peripheral edges joined together and portions of said walls intermediate said edges being spaced apart to form a chamber for containing ground coffee, the outermost peripheral portion of said bag being of a size to be received within the round container of said coffee maker and a portion of said joined edges being indented toward the central portion of said bag radially beyond the outer extremity of the bag providing a passage beyond the edge of the bag for fluid downwardly past the bag when in the coffee maker without such fluid passing through the bag.

3. A coffee bag as specified in claim 2 wherein the superposed edges of the top and bottom walls are scalloped around the periphery of the bag providing a plurality of passages for fluid around the bag when in a coffee maker.

4. A coffee bag as specified in claim 2 wherein the superposed edges of the top and bottom walls are sewn together forming an edge portion around the bag devoid of the coffee grounds within the bag so that liquid passing the edges of the bag do not pass through coffee grounds.

References Cited by the Examiner

UNITED STATES PATENTS

| | | | |
|---|---|---|---|
| 785,659 | 3/05 | Brown | 99—77.1 |
| 1,010,721 | 12/11 | Brown | 99—77.1 |
| 1,454,739 | 5/23 | Holland | 99—77.1 |
| 1,947,523 | 2/34 | Hirschhorn | 99—77.1 |
| 2,460,735 | 2/49 | Carroll | 99—77.1 |

A. LOUIS MONACELL, *Primary Examiner.*

RAYMOND JONES, *Examiner.*